(12) United States Patent
Werre et al.

(10) Patent No.: US 9,225,035 B1
(45) Date of Patent: Dec. 29, 2015

(54) LOW PROFILE BATTERY MODULE AND IMPROVED THERMAL INTERFACE

(71) Applicant: KleenSpeed Technologies Inc., Moffett Field, CA (US)

(72) Inventors: Justin Werre, Castro Valley, CA (US); Matthew P. Klein, III, Half Moon Bay, CA (US); Dante Zeviar, Burlingame, CA (US)

(73) Assignee: KleenSpeed Technologies Inc., Moffett Field, CA (US)

( * ) Notice: Subject to any disclaimer, the term of this patent is extended or adjusted under 35 U.S.C. 154(b) by 191 days.

(21) Appl. No.: 13/911,952

(22) Filed: Jun. 6, 2013

Related U.S. Application Data

(60) Provisional application No. 61/656,326, filed on Jun. 6, 2012.

(51) Int. Cl.
*H01M 10/04* (2006.01)

(52) U.S. Cl.
CPC .................................. *H01M 10/0468* (2013.01)

(58) Field of Classification Search
None
See application file for complete search history.

(56) References Cited

U.S. PATENT DOCUMENTS

2006/0234119 A1 * 10/2006 Kruger et al. ................. 429/160

* cited by examiner

*Primary Examiner* — Patrick Ryan
*Assistant Examiner* — Wyatt McConnell
(74) *Attorney, Agent, or Firm* — Aka Chan LLP

(57) ABSTRACT

An arrangement of a battery module and a method for making this module are presented. An embodiment is comprised of a plurality of Lithium-ion pouch type unit cells stacked in a linear array. A lightweight frame structure compresses the unit cells and the cells are encapsulated with thermally conductive epoxy. A method of assembly constrains the unit cells during encapsulation such that a thin wall of epoxy is achieved, reducing the thermal resistance of the side walls. A slotted flat panel is placed over the unit cells and the cell tabs protrude through the panel. An arrangement of slotted bus bars reside on the flat panel and the cell tabs are bent at right angles in a manner that allows the tabs to be attached to the bus bars by a soldering or similar means. In an embodiment of the battery module, the flat panel contains battery management circuitry.

20 Claims, 7 Drawing Sheets

LOW PROFILE BATTERY MODULE AND IMPROVED THERMAL INTERFACE

CROSS-REFERENCE TO RELATED APPLICATIONS

This patent application claims the benefit of U.S. provisional patent application 61/656,326, filed Jun. 6, 2012, which is incorporated by reference along with all other references cited in this application.

BACKGROUND OF THE INVENTION

This invention is related to battery modules for electric vehicles. More specifically, the subject of this invention is a battery module containing Lithium-polymer pouch type unit cells and having a thermal management system.

With the trend toward higher pack voltages and the use of Lithium-based batteries, the scope and complexity of fraction battery packs has increased. Depending on the required voltage, a typical battery pack is often comprised of a large number of individual unit cells, these cells being arranged in various series-parallel combinations. It is often desirable to group these cells into modules, which simplifies and standardizes the battery pack assembly process. The modules are typically of a size and weight that they can be lifted by a single person.

For many electric automobiles, the optimum placement of the battery pack is beneath the passengers and approximately mid-vehicle between the front and rear axles. When so located, the battery pack can be attached to the frame of the vehicle in such a manner that it is removable from the bottom of the vehicle. Additional benefits of this location include a favorable front-rear weight distribution and a low center of gravity. A practical height of such a battery pack from the top to the bottom of the enclosure is approximately 15 centimeters, and this height restriction imposes certain design constraints on the modules.

Pouch type cells are relatively flexible and vulnerable to impact and abrasion, and assembling large numbers of these cells into a rigid module can be difficult. The battery module assembly must provide means of supporting the cells and ensuring that they are not degraded by road forces. Further, it is desirable to maintain a consistent geometry as the cells tend to expand and contract during charge and discharge cycles.

Thermal management of pouch cells can also be difficult. When pouch cells are stacked together, the sides of the assembly are usually flexible and uneven, making it difficult to interface the assembly with a thermal management system. The prior art has included such solutions as the use of heavy and expensive metal fins interposed between the cells to extract heat.

Modules having a large number of unit cells require reliable high current connections between the cells. Degradation of a single connection can lead to battery pack failure with potentially dangerous results such as fire. Therefore, ensuring the integrity of the power circuit is critical to the proper functioning of the pack. The selected interconnect method should provide reliable, low resistance connections with minimum parts count.

Prior art battery modules may not satisfy the requirements for traction battery modules. Therefore, an improved battery enclosure is needed.

BRIEF SUMMARY OF THE INVENTION

With respect to the above background, it is an object of this invention to satisfy the stated requirements of a battery module in a manner that is low in parts count and can be produced economically by automated means.

An embodiment of this invention uses a particular method of arranging the unit cells, herein called a linear array, resulting in a battery module of a long prismatic shape. The form factor of the module is such that it can be used singly or in combination with other modules to comprise a complete battery pack.

To contain the unit cells, this battery module uses a combination of a clamping means and encapsulation with an epoxy polymer material. This method of retaining the unit cells provides a number of advantages: it compresses the cells in a manner that prevents them from swelling under load, it supports the weight of the cells and distributes those forces to the battery pack enclosure, and it allows the module to be easily integrated with a heat collecting manifold or chill plate.

In this invention, a compression process is used during encapsulation to form the assembly into a prismatic shape. Using compression reduces the thickness of the side walls and reduces packaging overhead by weight and by volume.

Thermal management of the unit cells is facilitated by using a thermally conductive epoxy material and by forming a thermal interface surface on at least one side of the module. This surface is smooth and planar, allowing a heat collection manifold or chill plate to be mounted to the module assembly. In combination with the thin side wall, a low thermal resistance path is established from the cells to the thermal interface surface.

A method of interconnecting the cell terminals is disclosed, in which a plurality of slotted bus bars is arranged such that the unit cells comprising a group are easily connected in parallel, and adjacent groups are then connected in series. This arrangement simplifies the assembly process and provides a low parts count. Additionally, this method places all of the unit cell tabs in a horizontal plane at the top of the module for ease of manufacture. By providing access to the cell terminals, a number of means may be used to attach the battery tabs to the bus bars, including but not limited to, resistance welding, ultrasonic welding, hot bar soldering, and the like.

An additional component of the battery module is an insulating panel that resides in a horizontal plane between the unit cells and the bus bars. This panel holds the cell terminals in position during manufacture and provides a supporting structure when soldering or otherwise attaching the battery tabs to the bus bars. In the preferred embodiment, this panel has an additional function. The panel can be a printed circuit board that contains the battery management circuitry for the module. When arranged in this manner, the board called a Battery Module Manager (BMM). The BMM performs such functions as monitoring the cell voltages, sensing temperature, and managing communication between modules. In combination with the bus bars, the BMM board results in very low parts count for the battery module.

The above arrangement results in a compact, readily manufacturable battery module with good thermal characteristics and a low parts count.

DETAILED DESCRIPTION OF THE INVENTION

Figure 1:
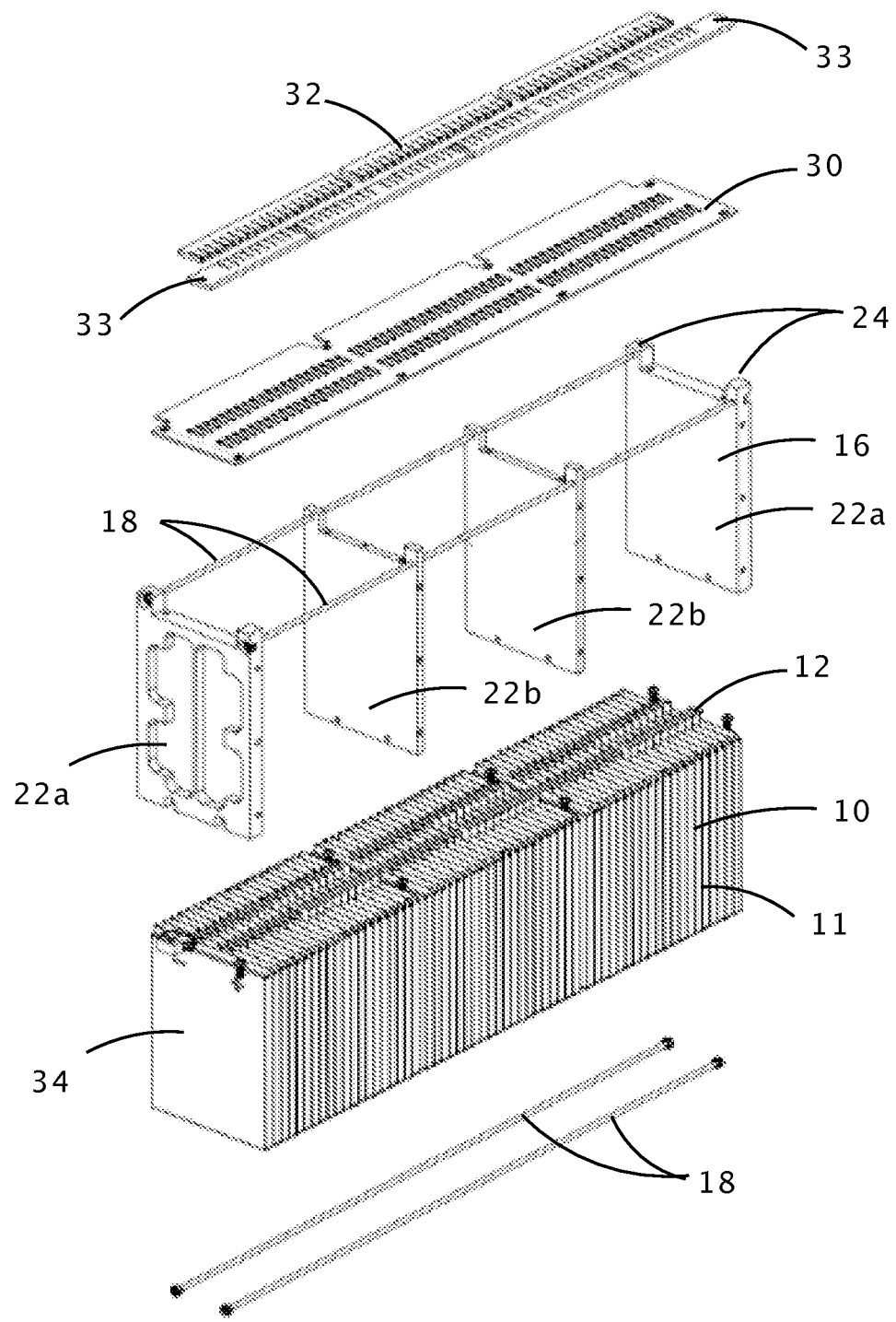
FIG. 1 is an exploded view of the battery module.

The battery module described herein is of a long prismatic shape which can be easily combined with additional modules to produce a complete battery pack. Depending on the required voltage and capacity, each module can be housed individually, or multiple modules can be arranged in a single enclosure. The exact form of the enclosure is not within the scope of this invention; however, a low profile battery pack with high energy density can be achieved by incorporating these modules.

The unit cells are arranged mechanically in a linear manner within the module. This arrangement is herein called a linear array. In the preferred embodiment of this invention, the interconnection topology is a series-parallel combination. The module is divided into groups of cells, each group comprising a predetermined number of cells connected in parallel. The cell groups are then placed in series and arranged in an alternating pattern of polarities to achieve the desired voltage.

In an embodiment of this invention, the battery module comprises 60 unit cells, providing a nominal module voltage of 22.2 Volts. The cells are interconnected in a particular series-parallel combination. Groups of cells are connected in parallel and the groups are connected in series to complete the battery module.

The described arrangement has a number of advantages, including the following: 1) A plurality of relatively small and inexpensive cells can be used, resulting in a low profile battery module; 2) Interconnection of cell terminals is simplified; 3) The battery module can be easily scaled to achieve the required voltage and energy capacity; 4) The topology is more tolerant of a cell failure than other topologies.

This method of grouping cells in parallel improves safety by reducing the likelihood of a short circuit within the module. Since all cells in a group have the same potential, the module can be easily constructed so that only cells of like potential are in contact with one another. Grouping the cells in this manner provides a means of reducing the danger of shorting the cells through the conductive pouches and other paths.

The unit cells of the embodiment are NCM type, Lithium polymer pouch cells, each with a nominal 10 Amp-hour capacity. The nominal energy stored by the battery module of this embodiment is 2.2 kWhrs.

Of course, the battery modules may use a different number of unit cells depending on the required voltage and energy capacity. The unit cells may have other chemical compositions, depending on whether power or energy is a preferred objective. Additionally, the connection topology may include other series/parallel combinations.

In this disclosure, the word "tab" is used to describe the flexible metallic cell terminal common to pouch cells. For the pouch cells in this disclosure, the tabs are arranged along one edge of the cell and not on opposite sides. The tab composition for the subject cells is nickel-plated copper. For the preferred embodiment, it is assumed that the metallic cell pouches are known to be insulated from the terminals.

In this description, a set of ten cells connected in parallel is called a "group." The battery module of this invention is comprised of six groups connected in series. In this disclosure, a set of 20 cells is referred to as a "double group."

FIG. 1 shows an exploded view of the module. For purposes of this description, the module is shown oriented so that the battery tabs project upward, although the module of this invention can be used in any position. The surface containing the battery tabs is herein called the "top," and the term "side" may be used to describe any of the other five surfaces.

The figure shows sixty unit cells 10 placed in a linear array with the terminals projecting upward. A frame 16 is comprised of four horizontal tensioning rods 18 and four lateral plates 22. The plates 22 serve to constrain and support the unit cells. The plates are comprised of two types, two aluminum end plates 22a and two polycarbonate inner plates 22b.

The purpose of the frame 16 is to compress the unit cells 10 longitudinally and thereby hold the cells in position. The frame supports the weight of the cells and distributes those forces to the battery pack enclosure. The lateral plates are flat on the bottom and extend a short distance past the bottoms of the cells, ensuring that the cells do not contact the enclosure. The resulting space beneath the cells can be used for a sheet of shock absorbing, moisture absorbing, or other insulating material. The lateral plates also have a plurality of upper projections 24 which have two functions: they locate the slotted panel 30 laterally, and they constrain the module from moving vertically within the battery pack 50.

In addition, the frame 16 prevents the unit cells from expanding, maintaining a constant geometry regardless of state of charge. The module is assembled in a low state of charge, which is its most contracted state. The frame is adjusted to a predetermined tensile force during assembly, which prohibits the cells from expanding significantly when charge is added to the module.

The module of FIG. 1 is shown without encapsulation; therefore, the outer flanges 11 of the unit cells are visible. As described below, when the module is manufactured and integrated, the cells are impregnated with an epoxy polymer material that covers the cell flanges.

A single flat panel 30 is shown disposed horizontally above the unit cells 10. The flat panel may be composed of a flame retardant insulating material such as FR-4. In the described embodiment, this panel is a printed circuit board that contains the battery management circuitry which monitors battery voltage, temperature, and other parameters.

A purpose of the flat panel 30 is to hold the cell tabs 12 in position during manufacture of the battery module. As shown in the figure, the tabs 12 protrude through the panel, allowing the tabs to be connected to bus bars 32, which interconnect the battery terminals in a series-parallel arrangement.

In the described embodiment, seven bus bars are used. As described below, there are three configurations of bus bars. The cell tabs 12 are attached to the bus bars 32 by a hot bar soldering process described below, although other attachment means are possible. The panel 30 provides a supporting surface for the bus bars during manufacture.

Figure 2:
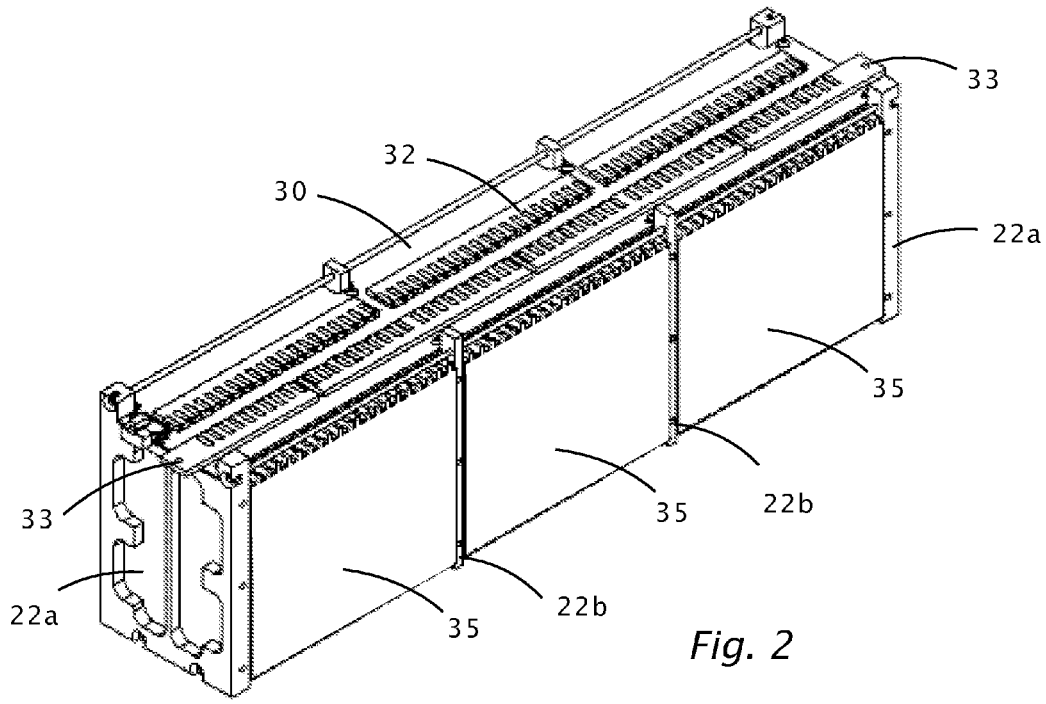
FIG. 2 shows an assembled battery module.

FIG. 2 shows an assembled battery module wherein the units cells are compressed and retained by the end plates 22a. The panel 30 resides on the cells and is fastened to the lateral plates 22. The bus bars 32 connect the battery tabs 12 one to the other.

In this figure, the cells are shown impregnated with an epoxy polymer material that covers the cell flanges. This results in at least one module side wall 35 that can be used as a thermal interface surface. The method of applying and forming the encapsulating material is disclosed below.

Figure 3:
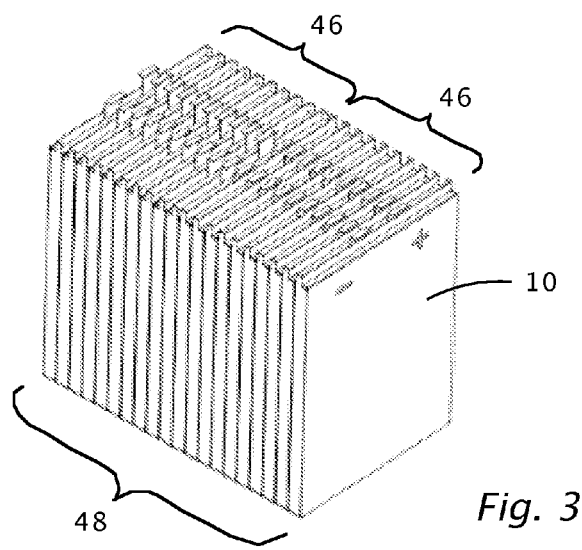
FIG. 3 shows a double group comprised of 20 unit cells.

FIG. 3 shows a set of 20 unit cells, also called a double group 48. A double group comprises two single groups 46. By examining the cell tabs 12 it will be noted that the single groups 46 have opposite polarity; that is, each single group is rotated 180 degrees from the other.

Figure 4:
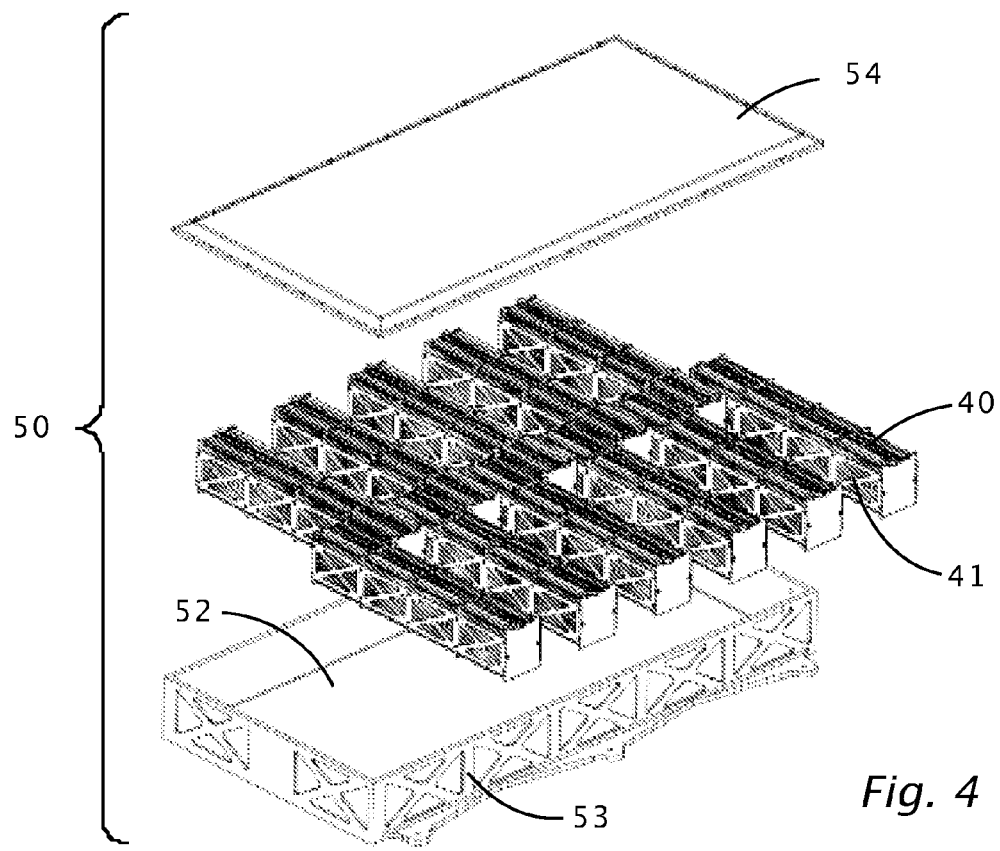
FIG. 4 is a simplified representation of a battery pack.

FIG. 4 is a simplified representation of a battery pack 50 comprised of a plurality of battery modules 40. The battery modules illustrated are of a second embodiment having reinforcing side panels 41. The battery pack enclosure includes a bottom 52 and a top 54, and the bottom has reinforcing features 53.

In the figure, the battery modules are shown staggered to better distinguish the individual modules. It can be seen that the battery modules of the current invention, having a low profile prismatic shape, can be easily arranged to form a battery pack. This arrangement is highly scalable and uses short interconnections. In a small automobile, the battery modules can be arranged in two adjacent rows comprising approximately 16 to 18 modules. The resulting pack voltage is approximately 355 to 400 Volts.

Figure 5:
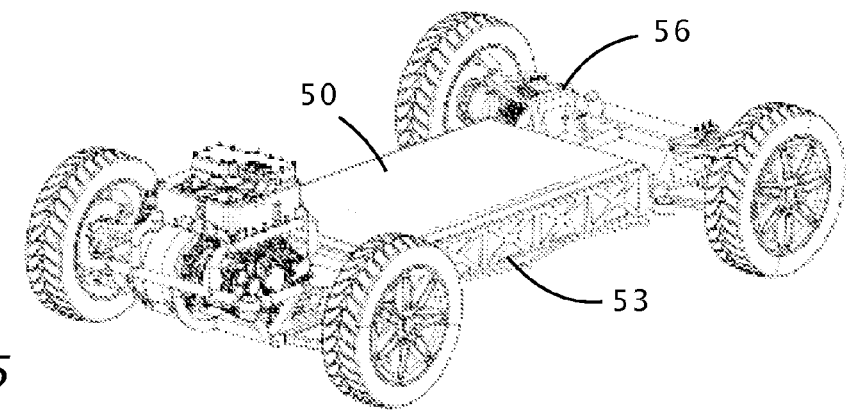
FIG. 5 shows a typical application in which a battery pack is integrated into a vehicle.

FIG. 5 shows a typical application in which the battery pack 50 is integrated into an electric vehicle 56. This arrangement can be seen to result in a low center of gravity and a beneficial front/rear weight distribution for a vehicle.

Figure 6:
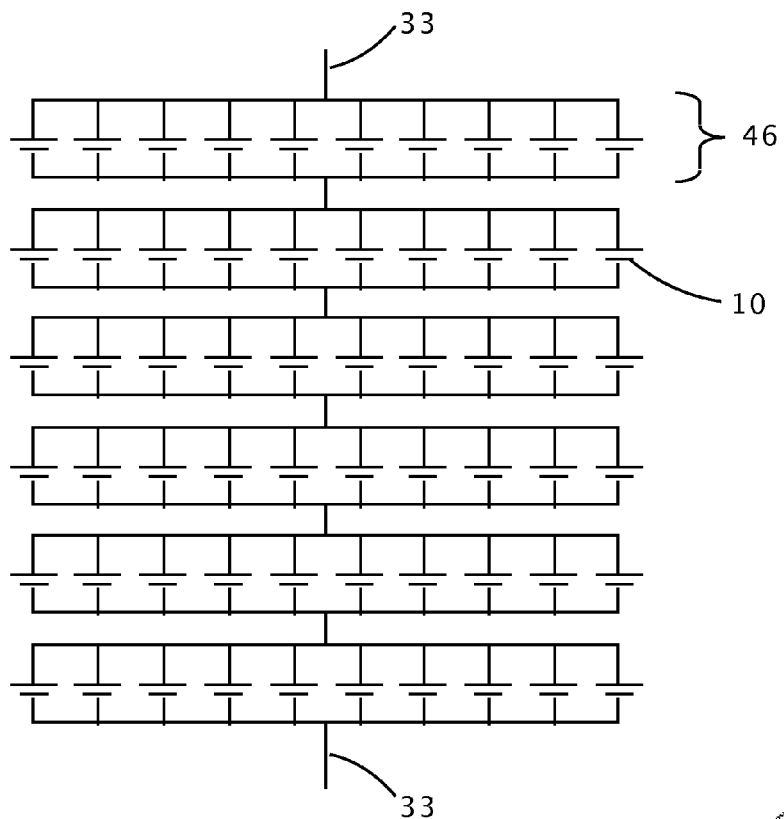
FIG. 6 is an electrical schematic showing the arrangement of the unit cells.

FIG. 6 is an electrical schematic showing the arrangement of the unit cells. The cells are organized into single groups 46, each group comprised of ten cells connected in parallel. Six of these groups are connected in series to complete the battery module. Of course, this number and grouping of cells is representative only. A benefit of this series-parallel arrangement is that it is highly scalable. Energy capacity and maximum current can be increased by increasing the number of cells comprising a group, with an accompanying increase in bus length. Another embodiment of the module maybe used in large vehicles where high current is required. For example, a group may comprise as many as 30 cells, resulting in a 3 C current capacity of 900 Amperes.

Another benefit of this series-parallel arrangement is that the failure of a single cell is not catastrophic. In the first embodiment incorporating 10 cells per group, a cell failure only reduces energy capacity by 10%, as opposed to a series string, where a single cell failure can disable the entire pack.

Figure 7:
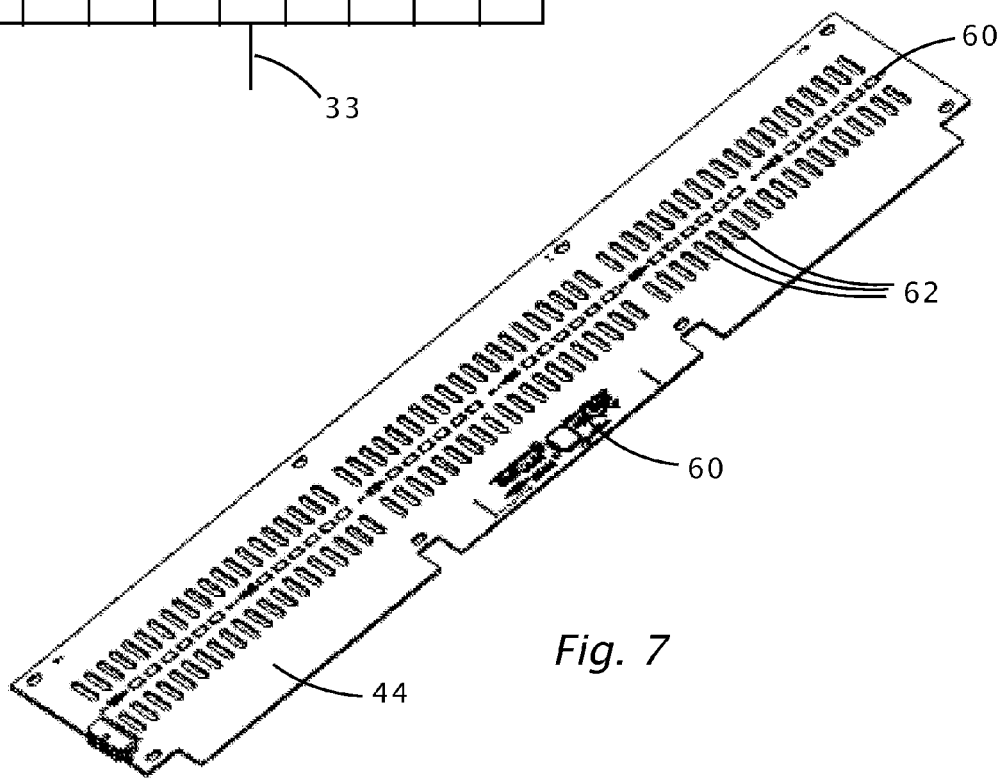
FIG. 7 shows a slotted panel comprised of a printed circuit board.

FIG. 7 shows an embodiment of the slotted panel in which the panel is a printed circuit board 44. The figure identifies possible locations of some BMS components 60. The slotted holes 62 are used to attach the PC board to the lateral plates (not shown). The slotted holes 62 permit adjustment of the lateral plates in the long direction to accommodate variations in unit cell thickness.

Figure 8:
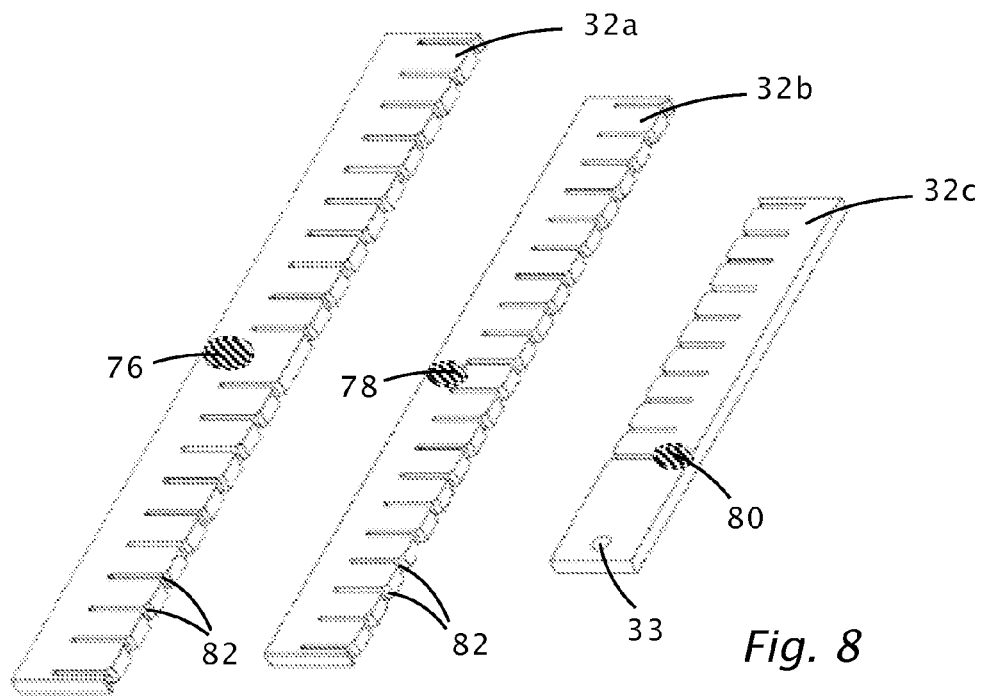
FIG. 8 shows the slotted bus bars.

FIG. 8 shows the slotted bus bars. Bus 32a is a bridge bus which traverses over the polycarbonate lateral plate and connects one double groups of cells 48 to another. Two bridge buses 32a are used in the current embodiment.

Bus 32b is a normal bus which interconnects the cells within a double group 46. Three normal buses 32b are used in the current embodiment.

Bus 32c is an end bus which interconnects a single group of ten cells and provides the termination points 33 for the battery module output. Two end buses 32c are used in the current embodiment.

Reference numerals 76, 78 and 80 indicate the points at which the greatest currents are sustained for each bus type.

The current density at these points may be estimated as follows: For the preferred embodiment, each cell group consists of ten cells, each cell rated at ten Amp-hours. Maximum current is based on the cell manufacturer's rating. Using a typical maximum current of 3 C, the entire cell group can supply 300 Amperes.

The bus bar "fingers" have chamfered edges 82 to facilitate engaging the tabs and sliding the buses into position. Means for attaching the tabs to the bus bars may include ultrasonic, laser welding, hot bar soldering, and other methods. The embodiment described herein incorporates hot bar soldering.

It is known to use encapsulation to assemble pouch type cells into a prismatic shape with uniform sides. However, encapsulation can result in unwanted packaging overhead, either by weight or geometry. In this disclosure, packaging overhead refers to either the weight added to the module by the packaging means, expressed as a percentage of the weight of the cells alone, or the volume added to the module by the packaging means, expressed as a percentage of the volume of the cells alone.

Figure 9:
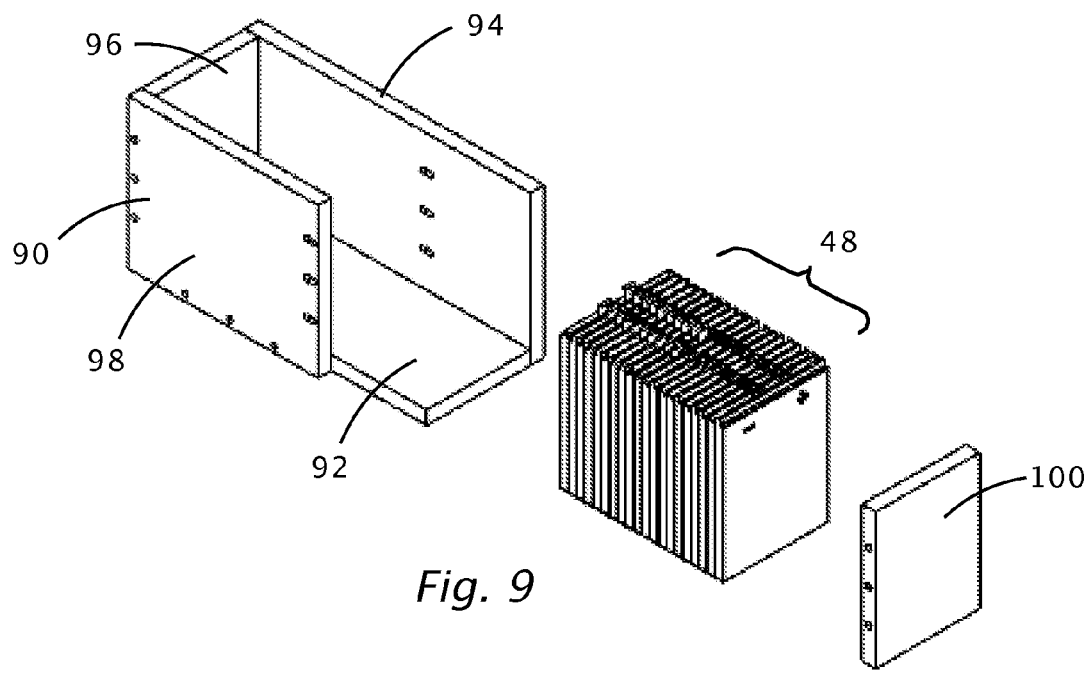
FIG. 9 shows a fixture used to assemble a set of unit cells into a prismatic assembly.

FIG. 9 shows a fixture used to impregnate a set of 20 unit cells (a double group) with epoxy and assemble the cells into a single prismatic assembly. The fixture is comprised of the following parts: a base 92, a fixed side panel 94, a fixed end panel 96, an adjustable side panel 98, and an adjustable end panel 100. The jig is constructed with one longer side to help guide the cells into position. These panels are used in a particular sequence to impregnate the unit cells with epoxy and form the assembly into a prismatic shape using a minimum of material. The use of this fixture is described in detail below.

Figure 10:
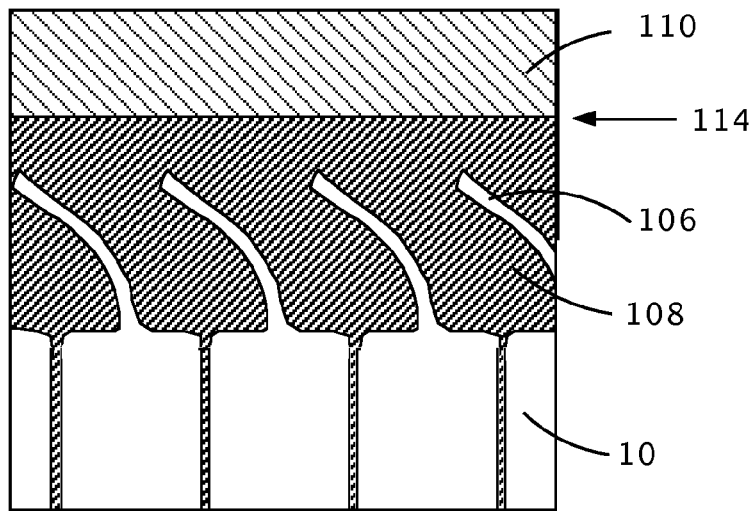
FIG. 10 shows a prior art method of encapsulating pouch type cells.
Figure 11:
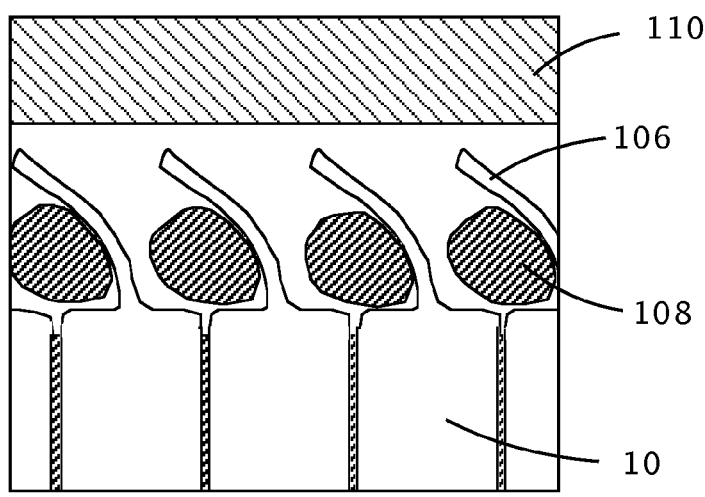
FIGS. 11 and 12 show a method of encapsulation as described in the assembly process of the invention.
Figure 12:
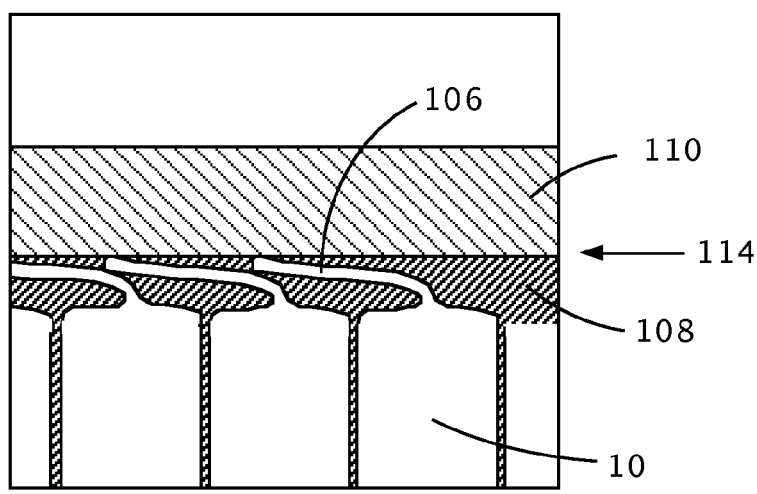

FIGS. 10, 11 and 12 shows methods of encapsulating the pouch type cells. The figures are simplified representations of several unit cells 10 and show the cell side flanges 106 as viewed from the top.

FIG. 10 shows prior art, in which a stationary mold 110 is used to contain a quantity of epoxy or other encapsulant. For this method, a relatively large volume of encapsulant is required to embed the cell flanges 106. This method results in a comparatively long thermal path from the body of the cell 10 to the thermal interface surface 114.

FIGS. 11 and 12 show the cells and flanges as they appear during the assembly process disclosed herein.

During this process, thermally conductive epoxy 108 is applied between the cell flanges 106. A fixture 110 applies compressive forces laterally to the module. The fixture presses against the flanges until the flanges are flattened, as shown in FIG. 12, removing voids and causing the epoxy to saturate the available space. When the epoxy has cured, the resulting wall thickness is thinner than the wall thickness shown in FIG. 10. The thinner wall results in lower weight, a narrower module, and a lower thermal resistance to the thermal interface surface 114.

Figure 13:
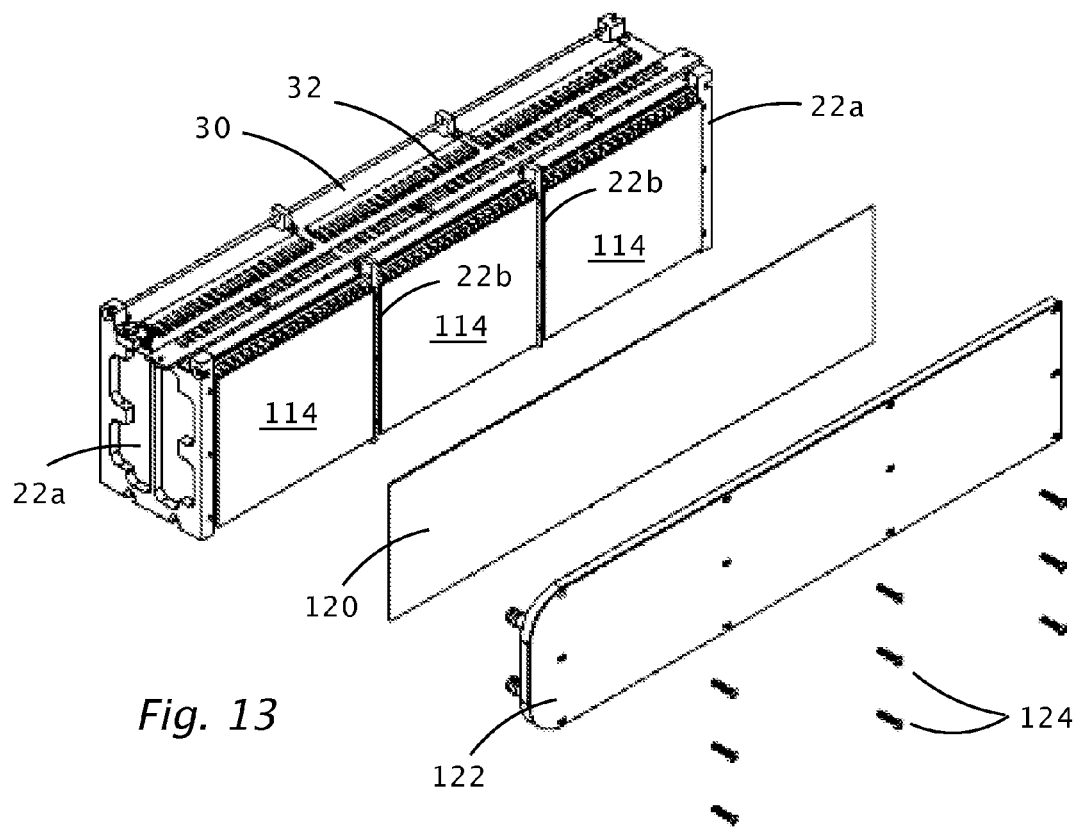
FIG. 13 shows how a chill plate may be added to a surface of the battery module.

The above process creates flat, rigid surface 114 to which a heat collecting manifold or chill plate can be attached. FIG. 13 shows how a chill plate may be added to this surface. In this example, one or more sheets of thermal interface material 120 is interposed between the cell groups and the chill plate 122. The chill plate is fastened to the lateral plates by means of machine screws 124. The fasteners are positioned so that they do not protrude into the cooling passages within the chill plate.

The above arrangement results in a compact battery module with low parts count. The battery modules of this invention have been determined to have a volumetric energy density of at least 180 Watt-hours/liter and a gravimetric energy density of at least 120 Watt-hours/kilogram.

The battery module assembly process is summarized as follows:

1. The jig is fully disassembled and each panel is coated with mold release wax. The panels are allowed to dry. The jig is reassembled with one end omitted and the smaller side loosely attached.

2. Working with one cell at a time, adhesive is placed on the cell and the cell is loaded into the fixture. For the preferred embodiment, KONA FT-LBDP thermally conductive epoxy is used. Cell polarity is as shown in FIG. 3. The width of the jig is initially set for optimum bending of the flanges.

The cells are coated with adhesive as follows: A line of adhesive is placed in each of the channels on the left and right sides of the cell. A small amount of adhesive is placed on the face of the cell and distributed evenly with a squeegee to a thickness of approximately 0.010 inch. The surfaces that contact the ends of the jig are not coated with epoxy.

4. The second set of ten cells is placed into the jig with the proper orientation.

5. The jig side panel is tightened to optimum compression as shown in FIG. 1-3, so the flanges are flattened but the cells are not distorted. The remaining end panel is attached. The encapsulation is inspected to ensure that the side that the thermal interface surface is smooth and without voids.

6. The adhesive is allowed to cure, the panels are loosened, and the assembly is removed from the fixture.

Figure 14:
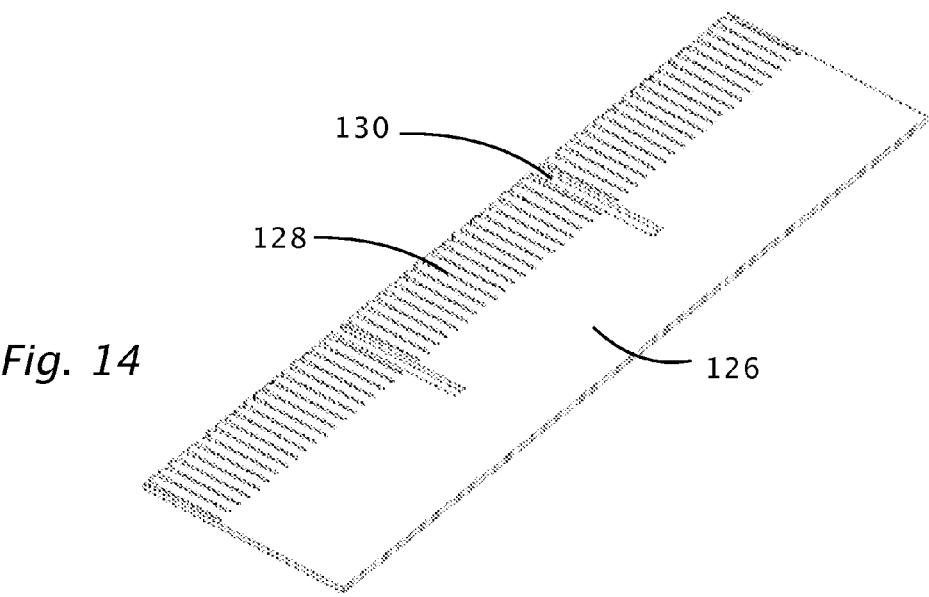
FIG. 14 shows a tool used to align the cell tabs.

7. The frame is partially assembled and the BMM is attached using a special tool 126 as shown in FIG. 14 to align the cell tabs. The tool has a comb-like shape and with a set of small slots to accept and align the cell tabs, and larger slots 130 to accommodate the later panels 22.

8. The required number of encapsulated double groups are integrated into the frame assembly. To ensure a flat thermal interface surface, the assembly can be done with the module on its side with the double groups resting a flat work surface. The frame compression nuts are torqued to approximately 3.4 Newton-meters.

9. One at a time, the bus bars are slid into position using the chamfered edges to guide the buses.

10. The cell tabs are folded over and soldered to the bus bars using a standard hot bar process. For the preferred embodiment, the bar is heated to 300 degrees C. as measured with an IR temperature sensor. Power to the cartridge is turned off and the bar is lowered onto the tabs, maintaining contact for 8 seconds. For the short buses, a smaller heat cartridge is used; for the long buses, a larger heat cartridge is used. A small amount of compressed air can be used to remove fumes and speed up the cooling process.

The above describes a manual procedure; however, means to automate this process will be apparent to one skilled in the art.

Other embodiments: This description of the invention is presented for the purposes of illustration and description. It is not intended to be exhaustive. Further, this description of the invention does not limit the invention to the precise form described, and many modifications and variations are possible in light of the teaching above. The embodiments were chosen and described in order to best explain the principles of the invention and its practical applications. Some alternative embodiments include but are not limited to:

Alternate battery chemistries and wiring configurations.
Use of the battery module in applications other than electric vehicles.
Use of the battery module with prismatic unit cells other than pouches.

The description will enable others skilled in the art to best utilize and practice the invention in various embodiments and with various modifications as are suited to a particular use.

The scope of the invention is defined by the following claims.

The invention claimed is:

1. A battery module comprising:
a plurality of pouch type unit cells, stacked linearly, cell terminals of the cells being arranged in two rows and interconnected;
a plurality of bus bars, interconnect the two rows;
a slotted insulating panel, interposed horizontally between the unit cells and the bus bars, the panel being slotted to accommodate the cell terminals, the cell terminals being bent at right angles so as to provide a substantial contact surface between the cell terminals and the bus bars, and the cell terminals being soldered to the bus bars; and
a thermally conductive epoxy, encapsulating the unit cells, wherein outer flanges of the unit cells are bent at an angle and each outer flange overlies a next outer flange, such that an outer wall of the thermally conductive epoxy is relatively flat.

2. The battery module of claim 1 comprising a frame coupled to the unit cells, wherein the unit cells are compressed by the frame, the frame comprising a plurality of lateral plates and tensioning bars, the tensioning bars passing through the lateral plates, the lateral plates being urged inwards by threaded fasteners.

3. The battery module of claim 2 wherein the lateral plates have upper projections on both ends, the projections locating the slotted insulating panel laterally.

4. The battery module of claim 1 wherein the pouch type unit cells are lithium ion unit cells having a volumetric energy density of at least 180 Watt-hours/liter and a gravimetric energy density of at least 120 Watt-hours/kilogram.

5. The battery module of claim 1 comprising a frame, wherein the pouch type unit cells are encapsulated in groups using the thermally conductive epoxy, and the frame couples the groups together.

6. The battery module of claim 1 wherein a jig is used to encapsulate the groups of pouch type unit cells and compress the outer flanges of the unit cells, such that each of the outer flanges overlays a next outer flange, and the jig reduces a thickness of the thermally conductive epoxy that forms an outer wall of the groups of pouch type unit cells.

7. The battery module of claim 1 wherein cell groups are positioned in the frame and aligned such that at least one smooth and uniform side wall is formed from the thermally conductive epoxy subsequent to being cured, and the cell terminals are bent at right angles and bonded to the bus bars.

8. The battery module of claim 7 wherein the cell terminals are bonded to the bus bars by a hot bar soldering process.

9. The battery module of claim 7 wherein the cell terminals are bonded to the bus bars by ultrasonic welding.

10. The battery module of claim 7 wherein a slotted, comb-like fixture is used to align the cell terminals prior to placement of the slotted insulating panel over the cell terminals, and the slotted, comb-like fixture is removed when the slotted insulating panel is positioned over the cell terminals place.

11. The battery module of claim 7 wherein fingers of the bus bars are chamfered to facilitate sliding the fingers of the bus bars under the cell terminals.

12. A battery module comprising:
a plurality of pouch type unit cells, positioned in a linear array, wherein cell terminals of the pouch type unit cells are arranged in two rows and interconnected;
a plurality of bus bars, interconnect the two rows;

a slotted insulating panel, interposed horizontally between the pouch type unit cells and the bus bars, wherein slots of the slotted insulating panel accommodate the cell terminals, the cell terminals are bent at right angles facilitating a substantial contact surface between the cell terminals and the bus bars, and the cell terminals being soldered to the bus bars; and a thermally conductive epoxy, encapsulating the unit cells, wherein outer flanges of the unit cells are bent at an angle and each outer flange overlies a next outer flange.

13. The battery module of claim 12 comprising:

a first lateral plate positioned at a first end of the linear array;

a second lateral plate positioned at a second end of the linear array;

a plurality of tension rods coupled to the first and second lateral plates that compress the first and second lateral plates and pouches of the pouch type unit cells;

a first bus bar of the plurality of bus bars positioned above the pouches and comprising a plurality of first slots;

a second bus bar of the plurality of bus bars positioned laterally adjacent to the first bus bar and above the pouches, the second bus bar comprising a plurality of second slots;

wherein the slotted insulating panel is positioned horizontally between the pouches and the first bus bar and between the pouches and the second bus bar and comprising a plurality of third slots and a plurality of fourth slots, wherein each of the first metal terminals extends through one of the first slots and one of the third slots, and each of the second metal terminals extends through one of the second slots and one of the fourth slots.

14. The battery module of claim 12 wherein each cell flange has a first length and the thermally conductive epoxy has a first thickness that is less than the first length.

15. The battery module of claim 12 wherein the thermally conductive epoxy layer forms an outer surface of the battery module.

16. The battery module of claim 12 comprising a plurality of epoxy layers, each epoxy layer is positioned on opposing faces of directly adjacent ones of the pouch type unit cells and is coupled to the thermally conducting epoxy layer.

17. A battery module comprising:

a plurality of pouch type unit cells, the pouch type unit cells being arranged in a linear array, each of the pouch type unit cell comprising a pouch, a first metal terminal extending from the pouch, a second metal terminal extending from the pouch, a first cell flange positioned along a first side of the pouch, and a second cell flange positioned along a second side of the pouch, wherein the first metal terminal are arranged in a first row and the second metal terminals are arranged in a second row that is adjacent to the first row;

a first lateral plate positioned at a first end of the linear array;

a second lateral plate positioned at a second end of the linear array;

a plurality of tension rods coupled to the first and second lateral plates that compress the first and second lateral plates and the pouches, wherein the first and second lateral plates and the tension rods place a compression force on the plurality of pouch type unit cells;

a first bus bar positioned above the pouches and comprising a plurality of first slots;

a second bus bar positioned laterally adjacent to the first bus bar and above the pouches, the second bus bar comprising a plurality of second slots; and an insulating panel positioned horizontally between the pouches and the first bus bar and between the pouches and the second bus bar and comprising a plurality of third slots and a plurality of fourth slots, wherein each of the first metal terminals extends through one of the first slots and one of the third slots and each of the second metal terminals extends through one of the second slots and one of the fourth slots.

18. The battery module of claim 17 comprising a first thermally conductive epoxy layer encapsulating the first cell flanges, wherein, except for a last one of the first cell flanges in the linear array, each first cell flange is angled to overlie a next one of the first cell flanges.

19. The battery module of claim 18 comprising a second thermally conductive epoxy layer encapsulating the second cell flanges, wherein, except for a last one of the second cell flanges in the linear array, each second cell flange is angled to overlie a next one of the second cell flanges.

20. The battery module of claim 19 wherein each first cell flange has a first length and the first thermally conductive epoxy layer has a first thickness that is less than the first length.

* * * * *